United States Patent
England et al.

(10) Patent No.: US 7,039,715 B2
(45) Date of Patent: May 2, 2006

(54) METHODS AND SYSTEMS FOR A RECEIVER TO ALLOCATE BANDWIDTH AMONG INCOMING COMMUNICATIONS FLOWS

(75) Inventors: Paul England, Bellevue, WA (US); Cormac E. Herley, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 745 days.

(21) Appl. No.: 10/152,112

(22) Filed: May 21, 2002

(65) Prior Publication Data

US 2003/0221008 A1    Nov. 27, 2003

(51) Int. Cl.
*G06F 15/16* (2006.01)
(52) U.S. Cl. .................. 709/232; 709/233; 370/235
(58) Field of Classification Search ........... 709/206, 709/207, 223, 224, 225, 226, 228, 232, 233, 709/234, 235; 370/235
See application file for complete search history.

(56) References Cited

U.S. PATENT DOCUMENTS

| | | | |
|---|---|---|---|
| 5,815,492 A | | 9/1998 | Berthaud et al. |
| 5,956,341 A | | 9/1999 | Galand et al. |
| 6,006,264 A | * | 12/1999 | Colby et al. ............ 709/226 |
| 6,075,772 A | | 6/2000 | Brown et al. |
| 6,343,085 B1 | | 1/2002 | Krishnan et al. |
| 6,502,131 B1 | * | 12/2002 | Vaid et al. ............ 709/226 |
| 6,690,678 B1 | * | 2/2004 | Basso et al. ........... 370/468 |
| 6,754,700 B1 | * | 6/2004 | Gordon et al. ........ 709/233 |
| 6,948,104 B1 | * | 9/2005 | Herley et al. .......... 714/712 |
| 2002/0181395 A1 | * | 12/2002 | Foster et al. .......... 370/229 |

OTHER PUBLICATIONS

"Four Steps to Application Performance Across the Network" by Packeteer, Inc., dated Nov. 2001.

* cited by examiner

*Primary Examiner*—Marc D. Thompson
(74) *Attorney, Agent, or Firm*—Wolf, Greenfield & Sacks, P.C.

(57) ABSTRACT

Disclosed are methods and systems for a receiver to autonomously allocate bandwidth among its incoming communications flows. The incoming flows are assigned priorities. When it becomes necessary to alter the allocation of bandwidth among the flows, the receiver selects one of the lower priority flows. The receiver then causes the selected flow to delay sending acknowledgements of messages received to the senders of the messages. In most modern protocols, senders are sensitive to the time it takes to receive acknowledgements of the messages they send. When the acknowledgement time increases, the sender assumes that the receiver is becoming overloaded. The sender then slows down the rate at which it sends messages to the receiver. This lowered sending rate in turn reduces the amount of bandwidth used by the flow as it comes into the receiver. This frees up bandwidth which can then be used by higher priority flows.

41 Claims, 13 Drawing Sheets

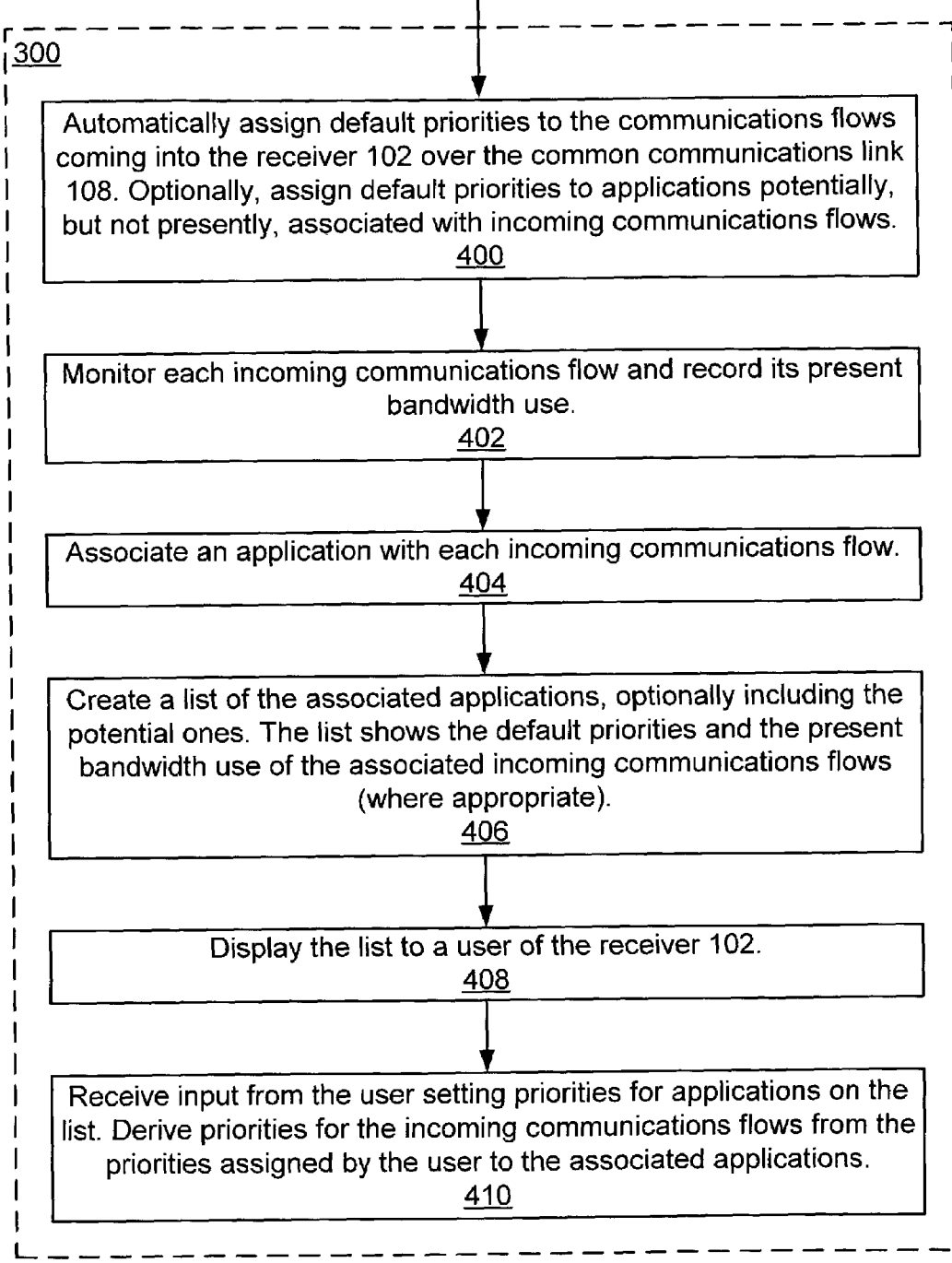

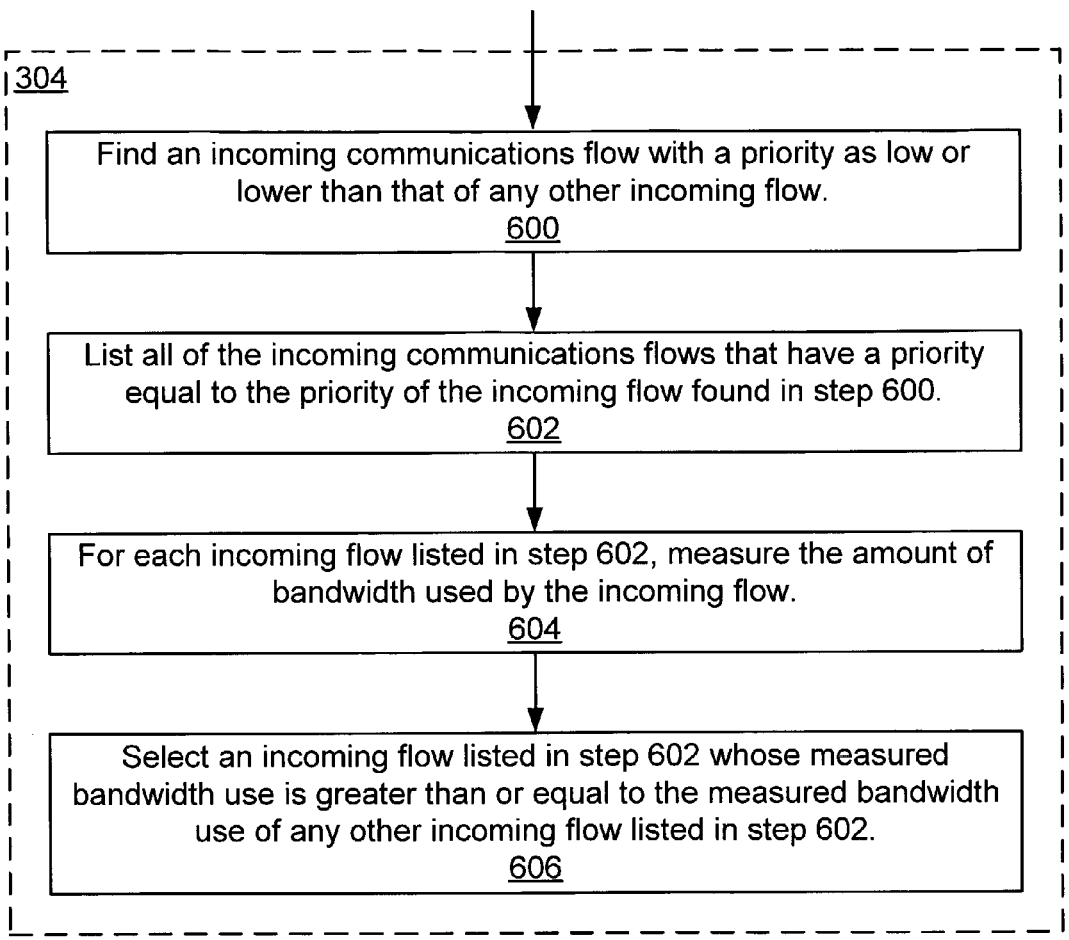

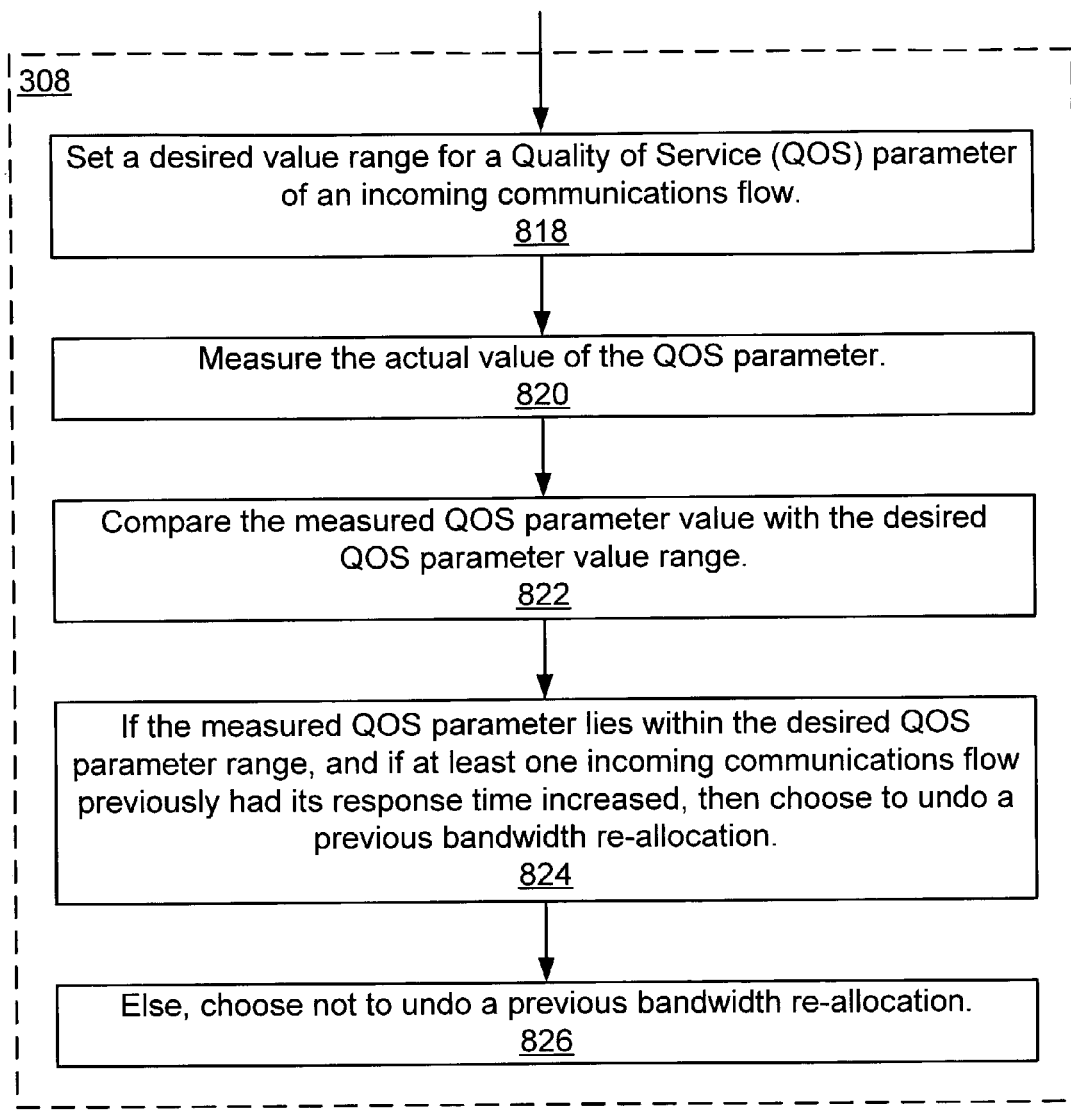

METHODS AND SYSTEMS FOR A RECEIVER TO ALLOCATE BANDWIDTH AMONG INCOMING COMMUNICATIONS FLOWS

TECHNICAL FIELD

The present invention is related generally to computer communications, and, more particularly, to controlling quality of service characteristics of incoming communications flows.

BACKGROUND OF THE INVENTION

Today's communications environment is rich with information providers, with the World Wide Web being the outstanding example. Modern communications technologies allow a Web user to download a software file to his computing device from one Web site, listen to a live music broadcast from another, all the while browsing through other Web sites searching for meaningful content. At the same time, the user may hold a telephone conversation, possibly with a live video feed, with another user using the Web to provide the communications connection. The user's computing device may also serve as a "gateway," providing communications services for another local computing device. This latter situation is common in home environment where all communications come through a central desktop computing device which then shares its communications capabilities with other devices in the home. Each of these activities creates one or more "flows" of communications coming into the user's computing device. In the typical set up, the user's device has just one communications link handling all of these flows simultaneously. The connection is typically a modem connection, or more and more commonly, a DSL (Digital Subscriber Line) or cable modem link.

The communications link has a limited total capacity, or "bandwidth," which it shares among all of the communications flows coming into the user's computing device. Typical modern communications protocols support this sharing and, when the sum of the bandwidth demands of all of the incoming flows exceeds the total bandwidth available on the shared communications link, the protocols allocate the bandwidth. This allocation is performed automatically by the protocols and eventually arrives at a more-or-less "fair" distribution of bandwidth among the competing communications flows. However, a "fair" distribution is rarely what the user wants. In a first example, when the user is working from home on one computing device that serves as a gateway for a second device, then the user may wish his work activities to take precedence in their bandwidth demands over a second user's entertainment activities.

Another reason for not wanting a "fair" distribution of bandwidth among the incoming communications flows is based on differences in bandwidth characteristics among various flows. The extent to which these differing characteristics are supported strongly affects the user's perception of the flows' quality. To illustrate, consider three "benchmark" communications flows. First, a telephone conversation is termed "real-time" because the listening parties are very sensitive to latency, that is, to delays in the communications process. Both the sending and the receiving flows display this sensitivity to latency. A packet of a remote speaker's voice information whose delivery is delayed by just half a second, for example, cannot be played upon its arrival. Rather, if the packet has not yet arrived when the time comes to play the voice contained in the packet, the listener may hear a "pop." When the late packet finally does arrive, it is worthless and is discarded. Real-time flows are often characterized by a fairly constant use of bandwidth over time. (The bandwidth used may vary somewhat over time with differing efficiencies achieved by compression algorithms.) Downloading live music is another example of a real-time communications flow, in this case involving only a receiving flow that is sensitive to latency. Receiver-side buffering can be used to relieve some, but not all, of the sensitivity to latency.

For a second benchmark communications example, consider a Web browser. The browser's communications flow is termed "interactive" because the amount of bandwidth demanded and the latency desired depend upon the user's actions at any one time. When the user clicks on an icon or otherwise requests a new page of information, the response may involve a large amount of information being sent to the user's computing device. The information is preferably delivered as quickly as possible so that the user does not have to wait long for it. After receiving the information, however, the user typically spends a while reviewing the information before making another request. During this period of user review, the browser's bandwidth demands are very low or nil. Thus, an interactive communications flow may be characterized by periods of little or no bandwidth demand interspersed with periods where large bandwidth and low latency are desirable.

The third benchmark communications flow example involves a file download. The user requests that a large amount of information be sent to the computing device. Unlike in the interactive flow example, the user is not staring at the screen of the device waiting for the download to complete. Rather, the user is paying attention to other communications flows. Because this type of communications flow is not directly tied to the user's immediate perceptions, it is termed a "background" flow. While this type of flow may demand enormous amounts of bandwidth, the demand may be satisfactorily met with small amounts of bandwidth spread over a long period of time.

When a user's computing device is simultaneously receiving examples of all three benchmark flows, it is clear that a "fair" allocation of bandwidth does not satisfy the user's requirements. Instead, an ideal allocation of bandwidth would give real-time flows as much bandwidth as they need as soon as they need it. Interactive flows would receive the remainder of the bandwidth when responding to the user's requests for information and would receive little or no bandwidth otherwise. Background flows would use any bandwidth not needed by the real-time and interactive flows. An ideal allocation would change moment by moment with changes in the bandwidth demands of the flows and would not waste any bandwidth due to allocation inefficiencies.

Such an ideal allocation is possible when all of the communications flows coming into the user's computing device originate at one sending device. The sender controls all of the flows and can allocate bandwidth accordingly. This case is the rare exception, however. A major benefit of today's communications environment is the proliferation of content providers and a user's ability to receive content from multiple providers to create a combined presentation unique to the user. This case of multiple, simultaneous providers is one consideration leading to the development of QOS (Quality of Service) protocols.

QOS protocols are used by senders and receivers to negotiate various aspects of their communications. When fully deployed, QOS protocols would be very useful for allocating bandwidth among competing incoming communications flows. If even a few devices do not yet implement full QOS protocols, however, the benefits of QOS can quickly become elusive. The user's computing device would not be able to depend upon the fact that all of its communications peers adhere to QOS and so would have to make other arrangements. Full QOS deployment is taking place only very slowly for many reasons. First, QOS protocols must be standards agreed upon by all participating parties. The protocol standardization process is slow because the needs of all participants must be accommodated without impeding the advanced capabilities of a few participants. Second, once the new QOS standards are set, all communicating devices must be upgraded to implement the standards, a process that can take years. Finally, because of their complexity, a full suite of QOS protocols may require more processing power to implement than some of today's smaller devices can afford.

What is needed is a way for a receiver computing device to autonomously change the allocation of bandwidth among its incoming communications flows.

SUMMARY OF THE INVENTION

In view of the foregoing, the present invention provides methods and systems for a receiver computing device, without the benefit of communicating with sending computing devices via QOS protocols, to autonomously allocate bandwidth among the communications flows coming into it. The receiver's incoming communications flows are assigned priorities, such as "real-time" priority, "interactive" priority, and "background" or "back-off" priority. When it becomes necessary to alter the allocation of bandwidth among the incoming communications flows, the receiver selects one or more of the lower priority flows. The receiver then causes the selected flows to delay sending acknowledgements of messages received to the senders of the messages. In most modern protocols, senders are sensitive to the time it takes to receive acknowledgements of the messages they send. When the acknowledgement time increases, the sender assumes that the receiver is becoming overloaded. The sender then "backs off" or slows down the rate at which it sends messages to the receiver. This lowered sending rate in turn reduces the amount of bandwidth used by the communications flow as it comes into the receiver. This frees up some bandwidth which can then be used by higher priority communications flows. Thus, the receiver changes the allocation of incoming bandwidth by moving some bandwidth from lower priority communications flows to higher priority flows, all without requesting a bandwidth change from the senders.

One aspect of the present invention presents several methods for setting priorities among the incoming communications flows. Some methods are automatic such as basing priority upon the type of application receiving the incoming communications flow or monitoring the incoming communications flow for characteristics indicative of a particular priority. Other methods include presenting a list of incoming communications flows to the user and allowing the user to set priorities. These methods may be used together, for example by automatically setting default priorities which may then be changed by the user.

Another aspect of the present invention concerns how to decide whether a re-allocation of bandwidth is necessary. In some simple cases, it may be appropriate to set a threshold target of total bandwidth use. For example, when the total amount of bandwidth in use exceeds 95% of the capacity of the communications link, then bandwidth is re-allocated from the lower priority communications flows to the higher priority flows. More sophisticated and efficient mechanisms include monitoring the actual communications characteristics of the higher priority communications flows to see if, for example, their latency targets are being met and, if not, then allocating more bandwidth to them. For an incoming communications flow of the interactive type, the corresponding outgoing flow can be monitored for indications, such as an HTTP (Hyper Text Transfer Protocol) GET( ) command, that the incoming flow will soon require much more bandwidth. The bandwidth is then re-allocated proactively.

In a third aspect, the present invention presents different ways of delaying message acknowledgements on a selected, lower priority communications flow. A Layered Service Provider (LSP) may be placed between the protocol stack, run in the kernel of the receiver's operating system, and the application receiving the incoming communications flow. To delay acknowledgements, the LSP can be directed to insert "sleep" commands that increase the amount of time it takes for the application to receive incoming messages or to increase the amount of time it takes for outgoing acknowledgements to be sent out over the communications link.

In yet another aspect, the present invention decides when to "undo" a bandwidth reallocation performed previously. This is appropriate because the re-allocation methods available to the receiver may sometimes introduce inefficiencies in overall bandwidth use and should therefore be undone when their purpose has been served.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

FIG. 4a is a flow chart depicting one method available to a user for setting priorities for communications flows coming into a receiver, and FIG. 4b is an exemplary screen display usable with the method depicted in FIG. 4a;

FIG. 6 is a flow chart showing an exemplary method a receiver can use to select one of its incoming communications flows for reduced bandwidth use;

FIGS. 8a through 8c are flow charts depicting various methods that a receiver may use to decide whether to "undo" the effects of a bandwidth re-allocation made previously, FIG. 8a's method monitors the total amount of bandwidth used by all incoming flows, in FIG. 8b's method the decision is based on a passage of time during which an interactive flow does not make a request for more bandwidth, and in FIG. 8c QOS parameters are monitored.

DETAILED DESCRIPTION OF THE INVENTION

Figure 1:
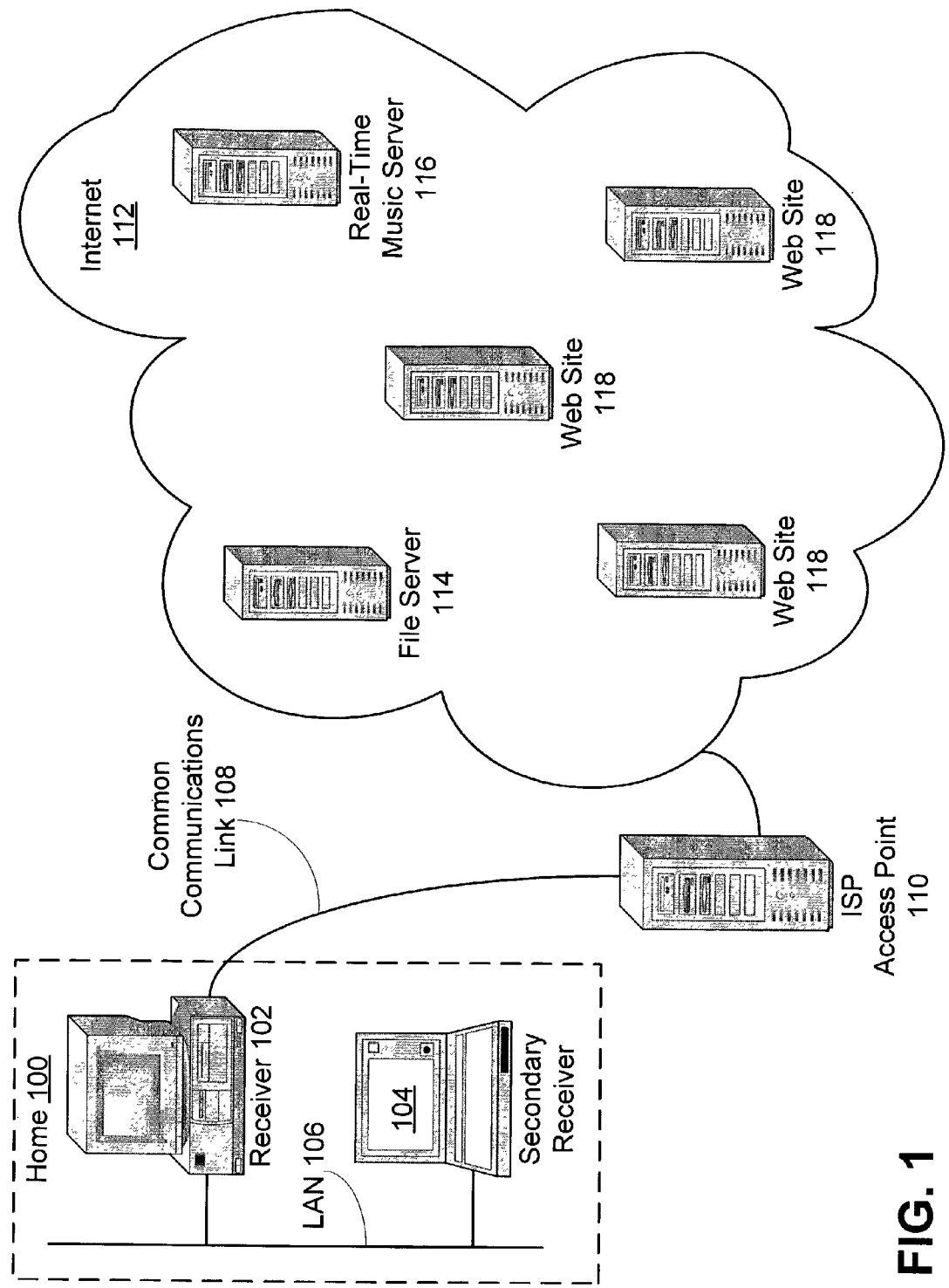
FIG. 1 is a block diagram showing an exemplary communications environment with a receiver computing device acting as a communications gateway for another computing device, an Internet Service Provider's Access Point server, and a few sender computing devices on the Internet.

Turning to the drawings, wherein like reference numerals refer to like elements, the present invention is illustrated as being implemented in a suitable computing environment. The following description is based on embodiments of the invention and should not be taken as limiting the invention with regard to alternative embodiments that are not explicitly described herein.

In the description that follows, the present invention is described with reference to acts and symbolic representations of operations that are performed by one or more computing devices, unless indicated otherwise. As such, it will be understood that such acts and operations, which are at times referred to as being computer-executed, include the manipulation by the processing unit of the computing device of electrical signals representing data in a structured form. This manipulation transforms the data or maintains them at locations in the memory system of the computing device, which reconfigures or otherwise alters the operation of the device in a manner well understood by those skilled in the art. The data structures where data are maintained are physical locations of the memory that have particular properties defined by the format of the data. However, while the invention is being described in the foregoing context, it is not meant to be limiting as those of skill in the art will appreciate that various of the acts and operations described hereinafter may also be implemented in hardware.

The exemplary home environment 100 of FIG. 1 contains a receiver computing device 102 and a secondary receiver computing device 104 tied together by a local area network (LAN) 106. These computing devices are called "receivers" because the present invention focuses on methods accessible to receivers of incoming communications flows to allocate bandwidth among those flows without explicitly communicating with the senders that are delivering content over those flows. Despite their designation, the receivers 102 and 104 may be simultaneously sending content to other computing devices.

The home 100 is shown as having one common communications link 108 that serves both receivers 102 and 104. The common link 108 may be based on any number of technologies, different technologies providing different characteristics, especially different amounts of bandwidth. The common link 108 may, for example, be a temporary dial-up modem line or wireless connection or a more permanent DSL or cable modem link. In any case, while the common link 108 is directly connected to the receiver 102, the bandwidth of the common link 108 is shared between both receivers 102 and 104 in the home 100. The receiver 102 acts as a gateway, providing communications services to the secondary receiver 104. Communications coming in over the common link 108 intended for the secondary receiver 104 pass through the receiver 102, are put onto the LAN 106, and from there reach the secondary receiver 104.

The remote end of the common communications link 108 terminates on an Internet Service Provider's (ISP's) Access Point server 110. The present invention is applicable in situations beyond the Internet 112, but the Internet 112 is a good exemplary environment for discussing the invention because the Internet 112 provides a wealth and variety of content. For example, using its link to the Internet 112, the receiver 102 may be downloading a file, such as an encyclopaedia article, from the file server 114. At the same time, a user of the receiver 102 may be listening to a live concert broadcast by the real-time music server 116. Also at the same time, users of the receiver 102 and of the secondary receiver 104 may be browsing the subset of the Internet 112 called the World Wide Web, searching for relevance among the Web sites 118. All of the communications coming into the home 100, including the file download, the live concert broadcast, and the browsed Web content, flow over the common link 108 and share, sometimes haphazardly, its limited bandwidth. Because haphazard sharing does not always accord with the needs of the users of the receivers 102 and 104, the invention is directed to methods for these users to directly influence the sharing.

Figure 2:
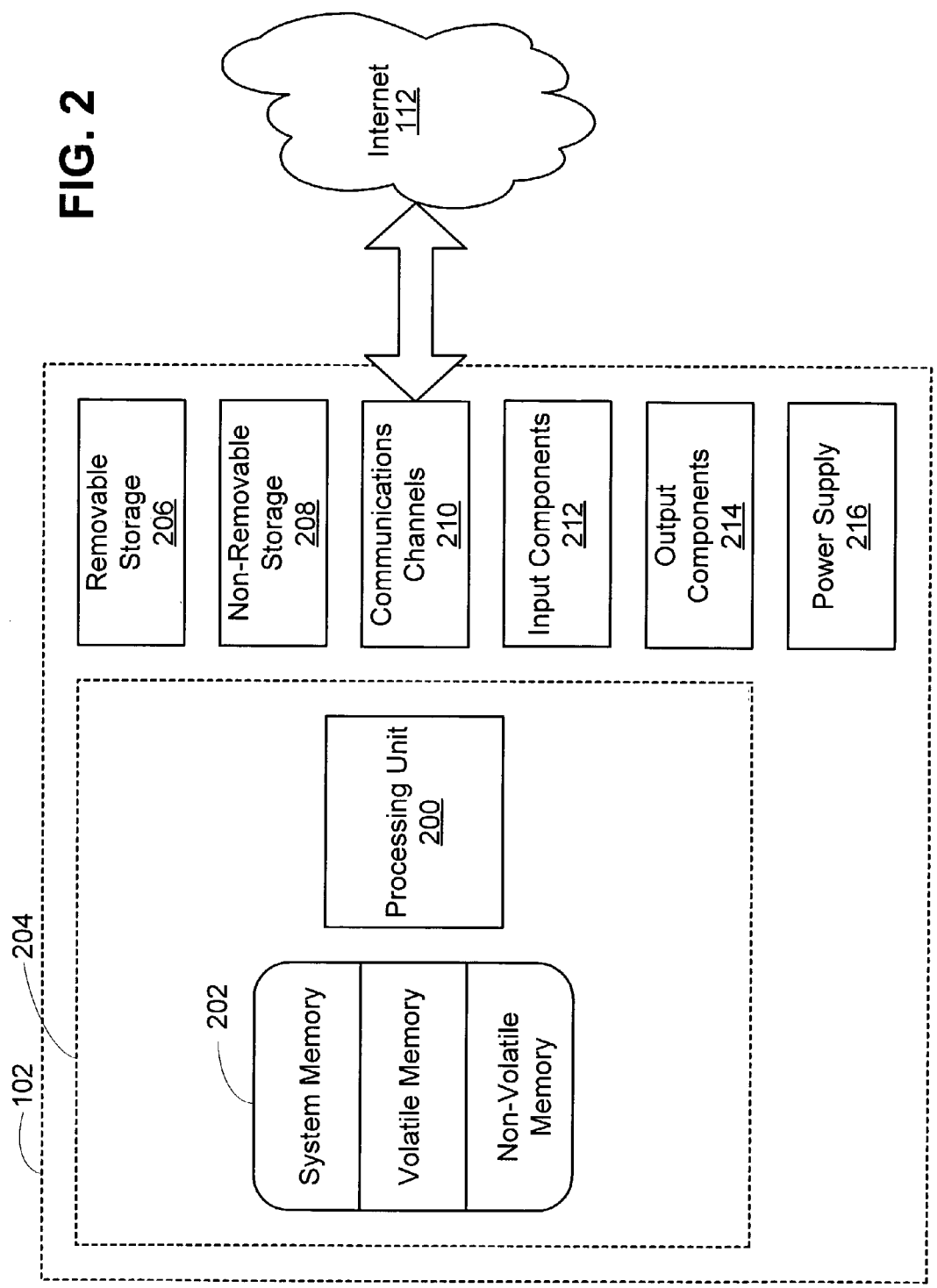
FIG. 2 is schematic diagram generally illustrating an exemplary computing system that supports the present invention.

The receiver 102 of FIG. 1 may be of any architecture. FIG. 2 is a block diagram generally illustrating an exemplary computer system that supports the present invention. The computer system of FIG. 2 is only one example of a suitable environment and is not intended to suggest any limitation as to the scope of use or functionality of the invention. Neither should the receiver 102 be interpreted as having any dependency or requirement relating to any one or combination of components illustrated in FIG. 2. The invention is operational with numerous other general-purpose or special-purpose computing environments or configurations. Examples of well known computing systems, environments, and configurations suitable for use with the invention include, but are not limited to, personal computers, servers, hand-held or laptop devices, multiprocessor systems, microprocessor-based systems, set-top boxes, programmable consumer electronics, network PCs, minicomputers, mainframe computers, and distributed computing environments that include any of the above systems or devices. In its most basic configuration, the receiver 102 typically includes at least one processing unit 200 and memory 202. The memory 202 may be volatile (such as RAM), non-volatile (such as ROM or flash memory), or some combination of the two. This most basic configuration is illustrated in FIG. 2 by the dashed line 204. The receiver 102 may have additional features and functionality. For example, the receiver 102 may include additional storage (removable and non-removable) including, but not limited to, magnetic and optical disks and tape. Such additional storage is illustrated in FIG. 2 by removable storage 206 and non-removable storage 208. Computer-storage media include volatile and non-volatile, removable and non-removable, media implemented in any method or technology for storage of information such as computer-readable instructions, data structures, program modules, or other data. Memory 202, removable storage 206, and non-removable storage 208 are all examples of computer-storage media. Computer-storage media include, but are not limited to, RAM, ROM, EEPROM, flash memory, other memory technology, CD-ROM, digital versatile disks, other optical storage, magnetic cassettes, magnetic tape, magnetic disk storage, other magnetic storage devices, and any other media that can be used to store the desired information and that can be accessed by the receiver 102. Any such computer-storage media may be part of the receiver 102. The receiver 102 may also contain communications channels 210 that allow it to communicate with other computing devices. Communications channels 210 are examples of communications media. Communications media typically embody computer-readable instructions, data structures, program modules, or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communications media include wired media, such as wired networks and direct-wired connections, and wireless media such as acoustic, RF, infrared, and other wireless media. The term "computer-readable media" as used herein includes both storage media and communications media. The receiver 102 may also have input devices 212 such as a keyboard, mouse, pen, voice-input device, touch-input device, etc. Output devices 214 such as a display, speakers, and printer may also be included. All these devices are well know in the art and need not be discussed at length here.

Figure 3:
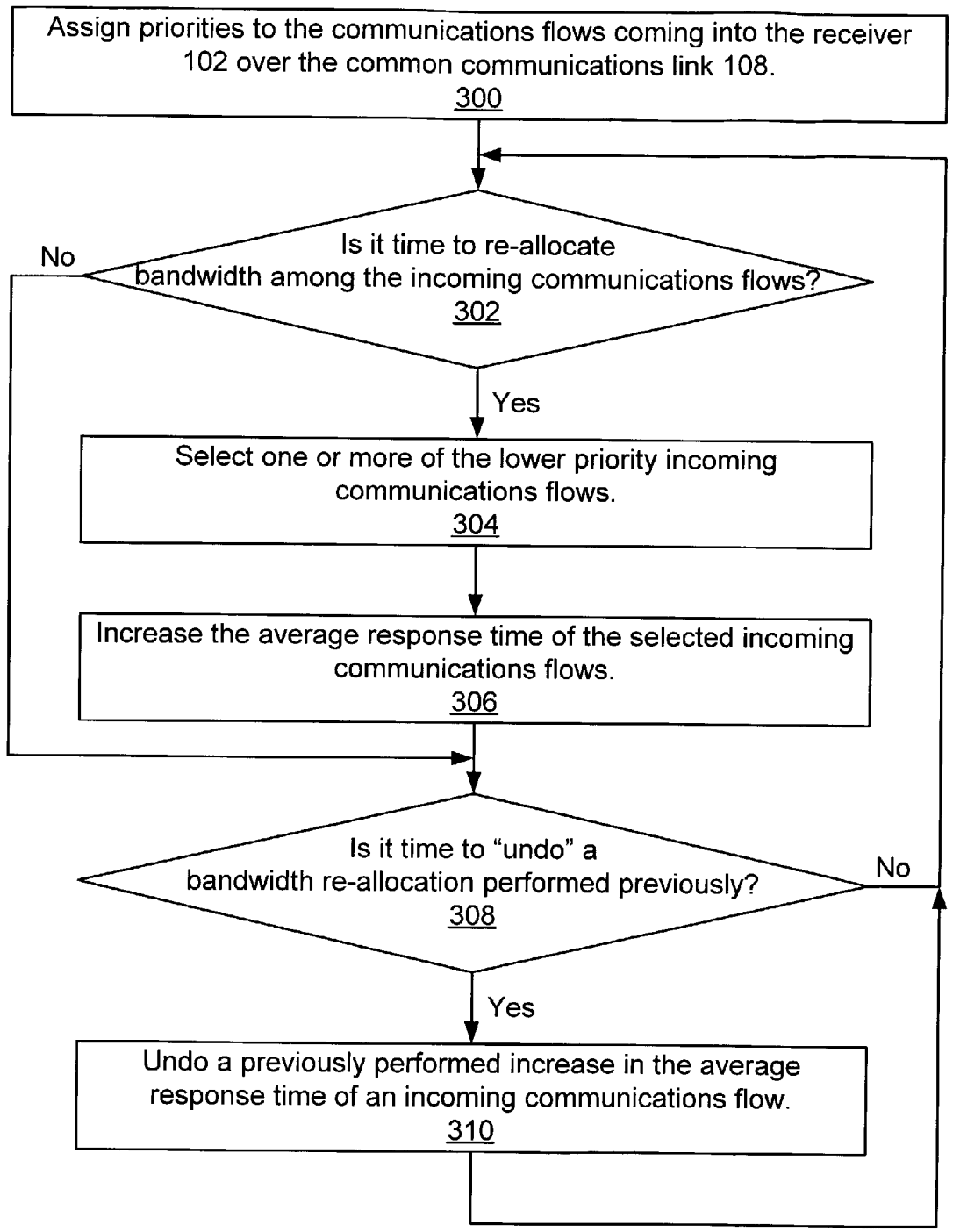
FIG. 3 is a flow chart illustrating an exemplary method for a receiver to allocate bandwidth among its incoming communications flows.

FIG. 3 presents a flowchart that overviews exemplary methods of the present invention. Further Figures detail various aspects of the invention and present alternative embodiments. The exemplary method begins in step 300 where priorities are assigned to the communications flows coming into the receiver 102 over the common communications link 108. The priorities are used later in the method (see step 304) to decide, when it becomes necessary to re-allocate the limited bandwidth of the common link 108, which incoming flows should relinquish some bandwidth for the benefit of other incoming flows. These priorities may be set automatically by software running on the receiver 102, by the direct intervention of a user of the receiver 102, or by some combination of these. Specific embodiments of and considerations pertaining to the assigning of priorities are discussed below in relation to FIGS. 4a and 4b.

The priorities having been set, the receiver 102 monitors the state of the communications flows coming in over the common communications link 108. Monitoring may range from the simplistic, which essentially involves no actual monitoring at all, to applying quite sophisticated techniques of traffic analysis. Different computing environments can support and can benefit from different monitoring techniques, some of which are discussed below in relation to FIGS. 5a through 5c. In any case, if the monitoring reveals in step 302 that a re-allocation of the bandwidth of the common link 108 would be beneficial, then the method of FIG. 3 proceeds to step 304.

In step 304, at least one of the lower-priority incoming communications flows is selected to relinquish some of the bandwidth it is currently using. It is in this step 304 that the priorities set in step 300 are used. Note that in the general case (with some exceptions discussed below), these priorities are not used in step 302 to decide that a re-allocation is necessary. Rather, other characteristics of the flows, admittedly related to the priorities, are used for that purpose.

Figure 7:
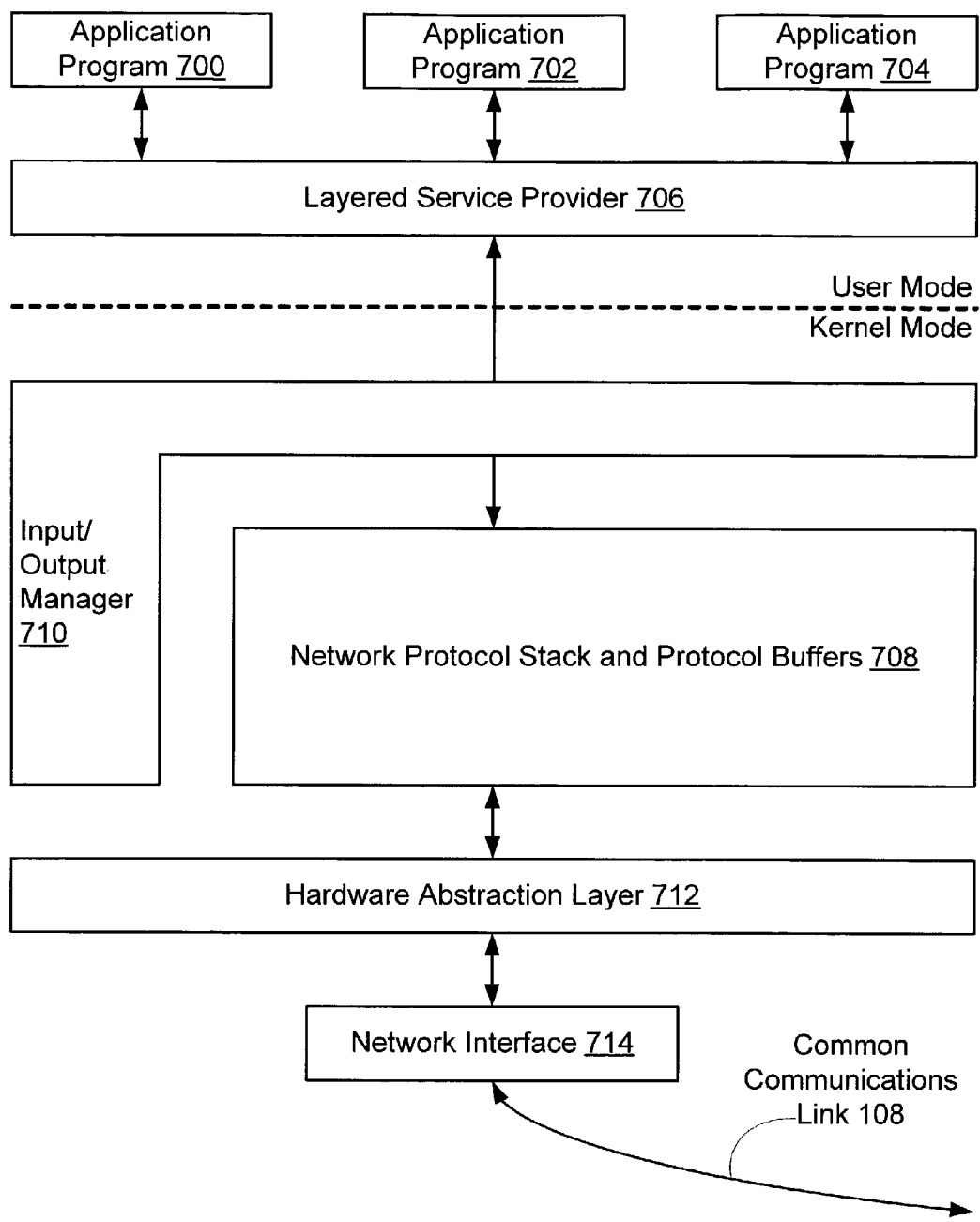
FIG. 7 is a schematic diagram of an exemplary system on a receiver for allocating bandwidth among the receiver's incoming communications flows.

Step 306 is the core of the method of FIG. 3. It is in this step that the receiver 102, without explicitly communicating with the senders of the incoming communications flows, reduces the bandwidth used by the incoming flows selected in step 304. The receiver 102 does this by increasing the response time of the selected incoming flows. This in turn causes the senders of the incoming flows to "back off" or reduce their sending rates. The senders' reduced sending rates are seen on the receiver 102 as reduced bandwidth usage of the selected incoming flows. The bandwidth relinquished by these selected flows becomes available for use by other, higher priority, incoming flows. The receiver 102 has some flexibility in how to increase the response times. FIG. 7 presents an exemplary embodiment of a bandwidth re-allocation system running on the receiver 102. The discussion accompanying FIG. 7 discusses some of the methods available to the receiver 102.

Steps 308 and 310 are the flip side of steps 302 through 306. If bandwidth was re-allocated in step 306, and if the purpose for that re-allocation (as decided in step 302) no longer applies, then steps 308 and 310 are invoked to "undo" the previous bandwidth re-allocation. While steps 308 and 310 are not strictly necessary, they are useful because in some cases the bandwidth re-allocation of step 306 leads to inefficiencies in the overall use of the bandwidth of the common communications link 108. When re-allocation is no longer necessary, steps 308 and 310 alleviate the possible inefficiencies caused by the re-allocation.

After step 310, the method of FIG. 3 continues in a loop to monitor the incoming communications flows, re-allocating bandwidth as necessary. This looping continues as long as there are flows coming in over the common communications link 108. The entire method of FIG. 3 may be repeated as often as necessary whenever the set of incoming flows changes or when it would enhance the communications environment of a user of the receiver 102 to change the priorities among the existing incoming flows.

The flow chart of FIG. 4a expands upon step 300 of FIG. 3, the priority-assigning step. In the optional step 400, software on the receiver 102 automatically assigns priorities to the communications flows currently coming into the receiver 102 over the common communications link 108. Priorities may also be assigned to applications that are potentially, but not presently, associated with incoming flows. A distinction should be made between assigning priorities to incoming flows and assigning priorities to applications. When the priorities are used (in step 304 of FIG. 3), they are used to select among the incoming flows. However, the incoming flows only exist to support the work of applications running on the receivers 102 and 104. It is these applications that users of the receivers 102 and 104 understand, and it is the performance of these applications that is a matter of concern to the users. Thus, in the description that follows, priorities are often set on the basis of applications. The priorities are then translated and applied to the incoming flows associated with the applications.

Several techniques are available to the receiver 102 to automatically set priorities in step 400. In a very simple case, an incoming communications flow's priority can be set to be the inverse of its current bandwidth use. While mostly arbitrary, this method at least leads to a somewhat even sharing of bandwidth when bandwidth demand exceeds the total bandwidth capacity of the common communications link 108. In a more sophisticated technique, the receiver 102 examines the name of an application associated with an incoming flow. An Internet Protocol telephony application, because of the real-time nature of its communications flows, would be given a "high" or "real-time" priority while a browser would get a "medium" or "interactive" priority. Unknown applications may by default be given a "low" priority, leaving it up to a user (see the discussion of steps 406 through 410 below) to change this as appropriate.

Instead of, or in addition to, the above techniques, the receiver 102 may choose to analyze the traffic patterns of a given incoming communications flow. A regular periodic pattern of similarly sized packets may tell the receiver 102 that the incoming flow is probably a real-time connection. Large variations in bandwidth use over time may indicate an interactive incoming flow or a low priority file download.

Several quite sophisticated traffic analysis techniques are well known in the art and need not be discussed here.

In some situations, a user of the receiver 102 may be content to accept the priorities automatically assigned in step 400. In other situations, the user may choose to directly intervene, altering the priorities to suit particular needs. Steps 402 through 410, and the exemplary screen shot of FIG. 4*b*, present one embodiment of the present invention that supports such intervention.

In step 402, the receiver 102 monitors the traffic on the common communications link 108 and records the amount of bandwidth presently being used by each incoming communications flow. In steps 404 and 406, a list is made of the applications receiving the incoming flows and the amount of bandwidth presently used by the incoming flows associated with the applications. If default priorities were set in step 400 (or if a user of the receiver 102 set priorities in a previous invocation of step 410), then those priorities are added to the list. As mentioned in the discussion of step 400 above, default priorities may be given to applications not currently associated with incoming flows. If so, those applications and their priorities are also included in the list.

In steps 408 and 410, the list is presented to a user of the receiver 102. The user may alter the default priorities of the applications or assign a priority where no default exists. The user-set priorities are then associated with the incoming communications flows. The list is stored both for use in selecting an incoming flow for bandwidth re-allocation in step 304 and for future re-invocations of steps 406 through 410.

Figure 4B:
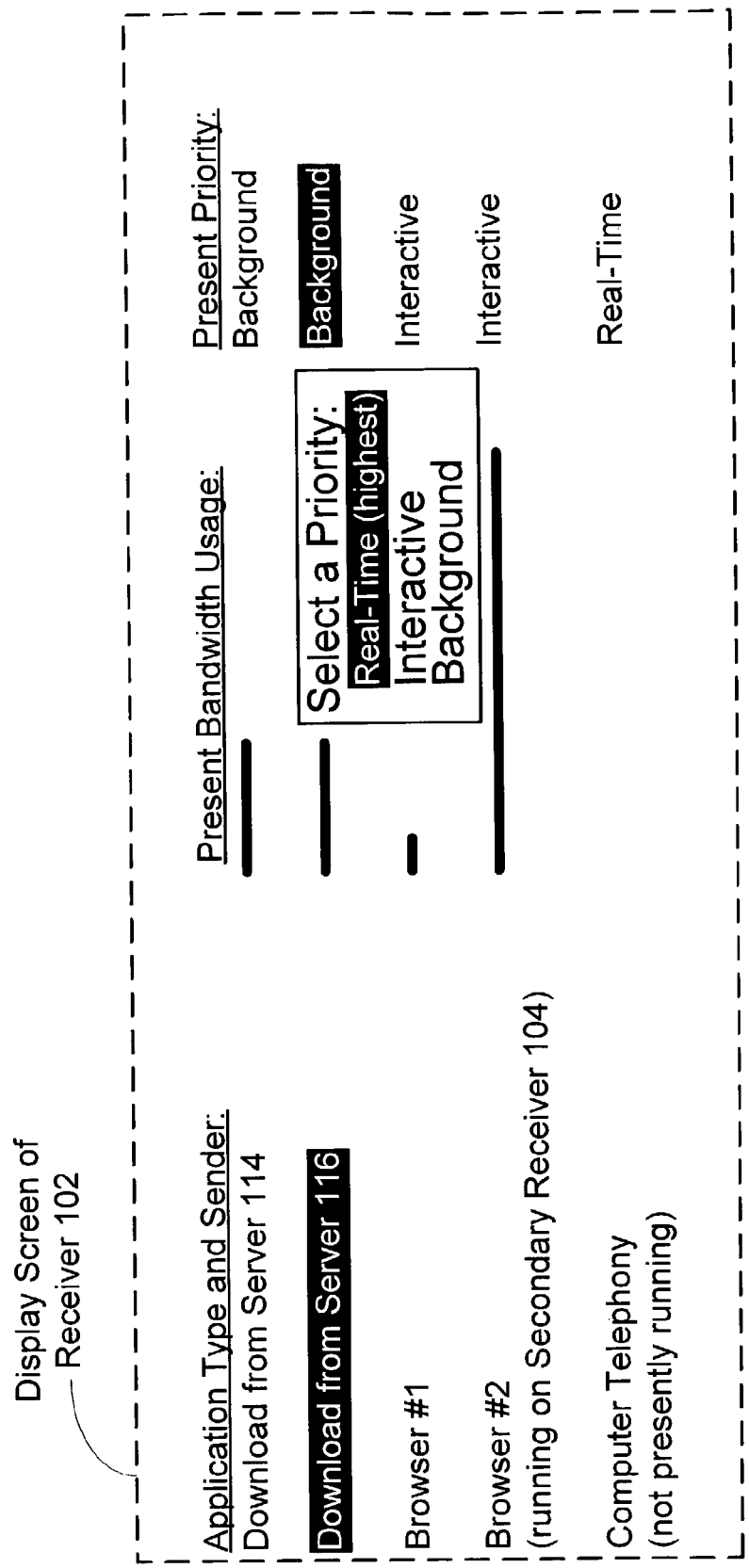

To illustrate aspects of the exemplary method of FIG. 4*a*, FIG. 4*b* presents an exemplary screen display, as may be produced by step 408. To prepare the first column, the receiver 102 associates each incoming communications flow with an application. Also included is a "Computer Telephony" application not presently associated with an incoming flow. If it can be determined, the first column displays the name of the sending computing device on the other end of the incoming communications flows. A user may choose to use this information in setting priorities. Also of interest to the user may be the location of each application: note that the "Browser #2" application is running on the secondary receiver 104 while the other listed applications are running on the receiver 102 (except, of course, the Computer Telephony application which is not presently running anywhere).

The second column of FIG. 4*b* displays the amount of incoming bandwidth of the common communications link 108 currently used by each application. The third column gives, for each application, the present priority, either automatically set by the receiver 102 or previously set by the user.

Upon reviewing the display of FIG. 4*b*, the user notices a problem. The receiver 102 decided that the first two applications on the list, "Download from Server 114" and "Download from Server 116," are of a similar type and should share a priority. The receiver 102 gave them both the default priority "background." The effects of this priority are seen in the second column, where these two application are presently using the same amount of bandwidth. This is not appropriate, however, as the automatic priority-setting program on the receiver 102 (for the sake of this example) is not sophisticated enough to realize that the while the first application listed is a regular file download, the second is actually a real-time music feed of a live concert and should be given a "high" or a "real-time" priority. The user, noticing a poor quality of reception, brings up the display of FIG. 4*b*, identifies the problem, selects the second application, and, by means of the pull-down menu box, assigns a "real-time" priority to the incoming music flow. Of course, a sophisticated automatic priority-setting program will probably not make the mistake shown in FIG. 4*b*; the mistake is shown purely to illustrate a case for user intervention in the priorities.

The user of the receiver 102 may notice another problem from the display of FIG. 4*b*. The second browser application, the one running on the secondary receiver 104, is using a great deal of bandwidth. This may represent recreational Internet use by another member of the household 100 and may conflict with more important activities of the user of the receiver 102. The user may alleviate the conflict by lowering the priority of the second browser below that of his own browser.

Figure 5A:
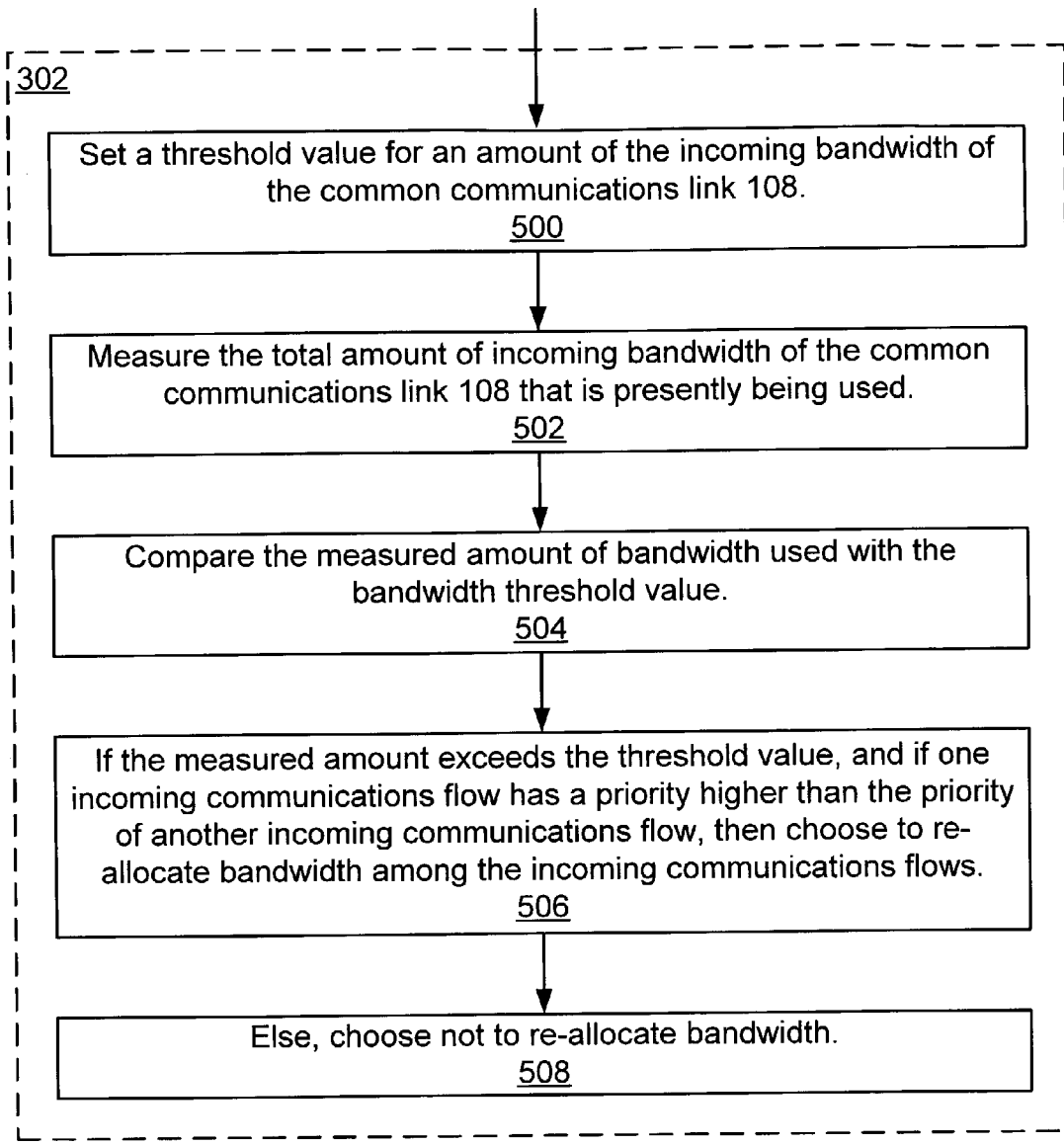
FIGS. 5a through 5c are flow charts showing a few methods that a receiver can use to decide whether to re-allocate bandwidth among its incoming communications flows, in FIG. 5a the decision is based on the total amount of bandwidth used by all incoming flows, FIG. 5b's method monitors an interactive flow for indications that it will soon need more bandwidth, and in FIG. 5c QOS parameters are set and monitored.
Figure 5B:
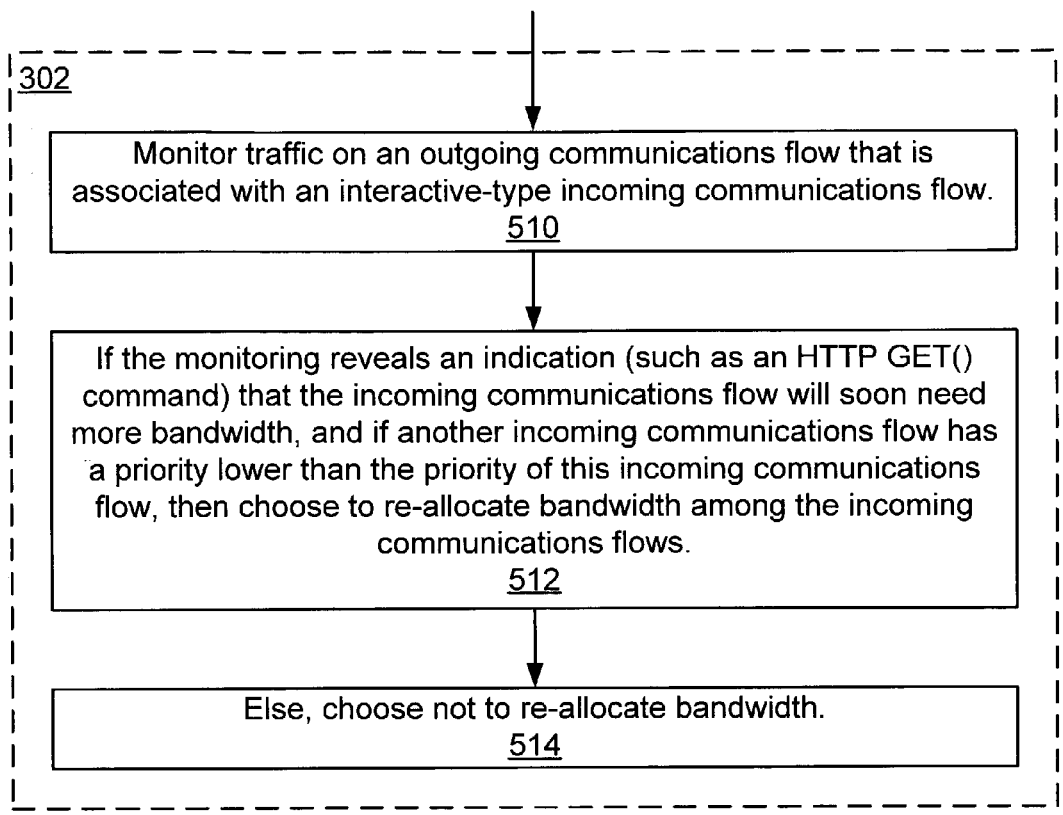
Figure 5C:
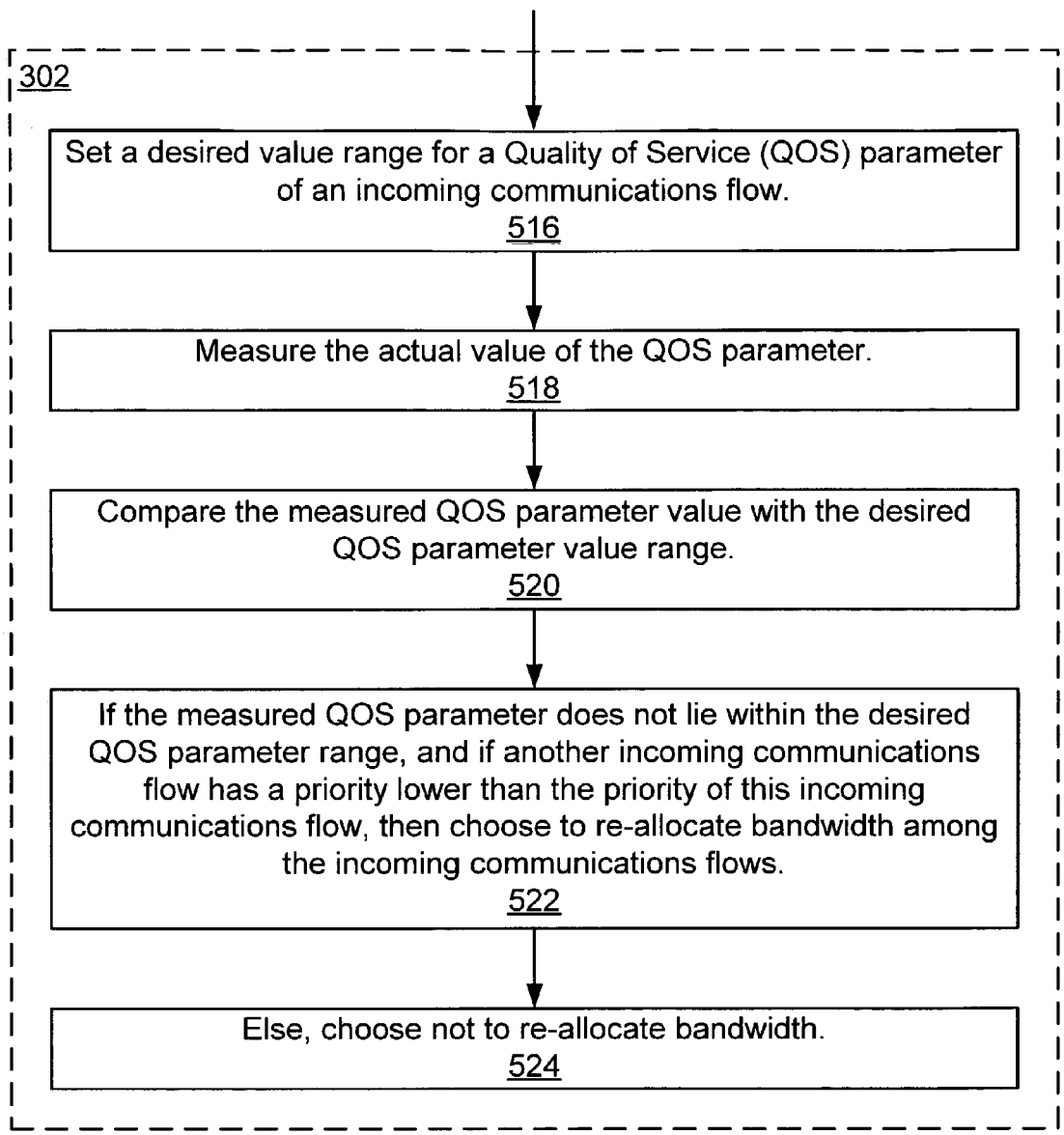

There are several methods the receiver 102 may use to decide, in step 302 of FIG. 3, that it may be advantageous to re-allocate bandwidth among the incoming communications flows. The flow charts of FIGS. 5*a* through 5*c* present a few possibilities for step 302. While these methods are presented separately, they may be combined to produce more sophisticated methods, the combination most appropriate at any one time depending upon the nature of the receiver 102's communications environment, especially the number and type of its incoming flows. When methods are combined, then the timing of the repeats of step 302 of FIG. 3 may be different for each method. That is, one method may be based on slowly changing information so the checking step 302 may only be invoked every few minutes. Step 302 may profitably be invoked every few seconds for another method based on quickly changing information.

In the method of FIG. 5*a*, a threshold is set in step 500. The threshold relates to the total amount of bandwidth of the common communications link 108 in use at any one time. For example, a threshold value of 90% may be set. The actual amount of bandwidth used by all of the incoming communications flows is measured in step 502 and compared against the threshold in step 504. If the amount of bandwidth actually used exceeds the threshold, then the receiver 102 predicts that it may be a good idea to re-allocate some bandwidth away from the lower-priority incoming flows, thus freeing up the bandwidth for use by higher-priority flows. Before making this decision, step 506 also looks to see if such a re-allocation may be made. If all of the current incoming flows are of the same priority, then the receiver 102 would not be able to select (in step 304 of FIG. 3) one of the incoming flows for relinquishing bandwidth. The receiver 102 can always avoid this situation, if there is no other basis for assigning different priorities to the incoming flows, by assigning priorities inversely related to the incoming flows' present bandwidth usage.

The method of FIG. 5*b* generally applies to interactive incoming communications flows. As discussed in the Background section above, these flows, e.g., for browsers, experience large swings in bandwidth demand. To accommodate these swings while producing a minimum latency for a user waiting for a response from a Web site, the receiver 102 in step 510 monitors an outgoing communications flow associated with the incoming flow. In the HTTP protocol, for example, a GET( ) command is sent to request information If the receiver 102 sees an HTTP GET( ) command (or a similar indication for another protocol) on the outgoing flow, then it knows that the associated incoming flow will soon have to accommodate a potentially large amount of response information. In step 512, the receiver 102 proactively decides that a reallocation may make sense. In association with the re-allocation, the receiver 102 may decide to temporarily increase the priority of the interactive incoming flow (not shown). This is only necessary if there are insufficient incoming flows of lower priority than the interactive incoming flow.

The final example of methods for deciding when to re-allocate bandwidth is given in FIG. 5c. This method is reminiscent of the method of FIG. 5a. However, the method of FIG. 5a looks at total bandwidth use to predict a future shortfall while the method of FIG. 5c looks at the current communications characteristics of a single incoming communications flow. In step 516 is set a desired range of a communications characteristic of an incoming flow. For an interactive incoming flow, for example, a typical characteristic would be response latency, with the range specifying a maximum acceptable value. Variations in transmission latency and minimum bandwidth are important to real-time incoming flows. In steps 518 and 520, the actual characteristic is measured and compared against the desired value range. If the characteristic does not lie within the desired value range, then the receiver 102 decides that a re-allocation of bandwidth may help to move the characteristic back into the desired range. Applying a more sophisticated technique (not shown), the receiver 102 may monitor the characteristic and take proactive action before the characteristic actually leaves the desired value range.

When step 302 of FIG. 3 results in a decision to re-allocate bandwidth among the communications flows coming into the receiver 102, one or more of the lower-priority incoming flows must be selected to relinquish some of its bandwidth. There are many methods for making this choice, and FIG. 6 presents just one of them. Because it makes sense to first take bandwidth away from the lowest-priority flows, the method begins in step 600 by finding the lowest priority currently in use among the incoming flows. A list is made in step 602 of all of the incoming flows that are assigned to this lowest, currently used priority. To select among the incoming flows on the list, step 604 measures the amount of bandwidth currently used by each flow on the list. The method of FIG. 6 ends in step 606 by selecting the incoming flow on the list that is currently using the largest amount of bandwidth. If the selected incoming flow cannot relinquish enough bandwidth to satisfy the higher-priority flows, then the method of FIG. 6 may be repeated, selecting another flow to relinquish some of its bandwidth.

FIG. 7 shows one possible implementation of a system that performs the bandwidth re-allocation of step 306 of FIG. 3. In this exemplary system, three application programs 700, 702, and 704 are running on the receiver 102. They communicate through a Layered Server Provider (LSP) 706 to the standard communications hardware and software provided by the receiver 102. In this case, a network protocol stack, with its internal buffers, 708 handles communications protocol issues. An input/output manager 710 sets up and tears down communications. The network protocol stack 708 talks to a hardware abstraction layer 712 which in turn talks to a network interface 714 that runs the common communications link 108.

When the decision is made in step 302 of FIG. 3 to re-allocate bandwidth and an incoming communications flow is selected to relinquish bandwidth in step 304, a command is sent to the LSP 706 to implement the re-allocation. If an incoming flow associated with the application program 700 has been selected, for example, then the LSP 706 upon receiving an incoming message on that flow may delay a while before sending the message to the application program 700. When the application program 700 issues a response over an outgoing flow associated with the selected incoming flow, the LSP 706 may delay sending the response to the network protocol stack 708. In either case, the delay slows down the application program 700's processing of the incoming flow. Eventually, the sender of the incoming flow will notice that it has sent a large number of messages to the application program 700 that have not yet been acknowledged. The sender will assume that the application program 700 is temporarily overloaded and will "back off" or reduce its sending rate. This reduced sending rate reduces the amount of bandwidth used by the selected incoming flow, freeing up bandwidth for other, higher priority incoming flows.

There are other techniques available to the LSP 706 to reduce the amount of bandwidth used by a selected incoming communications flow. As just one further example, the LSP 706 can direct the network protocol stack 708 to reduce the amount of buffer space allocated to the selected incoming flow. The reduction in buffering reduces the amount of incoming data that the network protocol stack 708 can accept from the incoming flow pending acknowledgement. This reduction in turn eventually leads to a reduction in the amount of bandwidth used by the incoming flow.

Figure 8A:
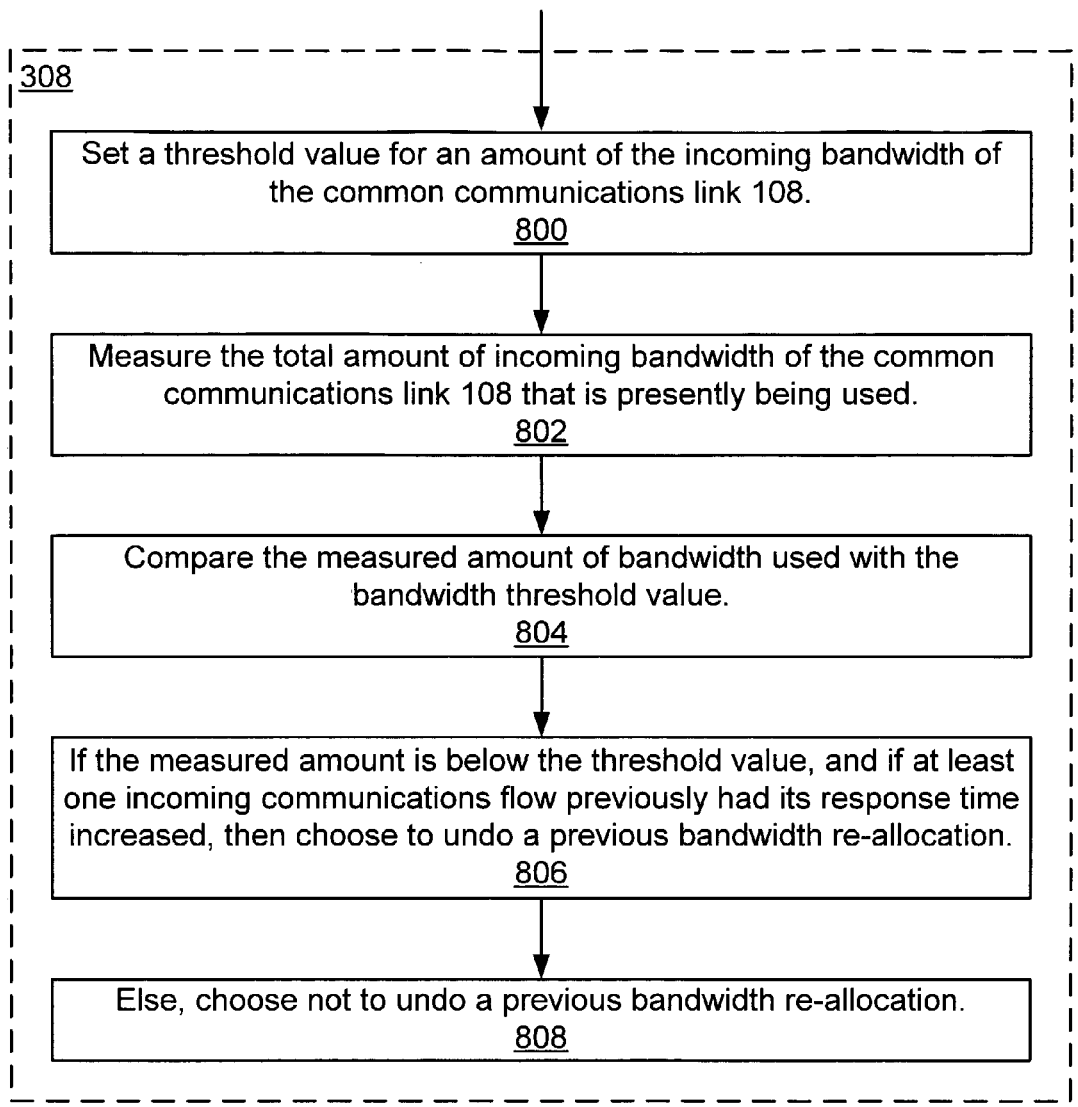
Figure 8B:
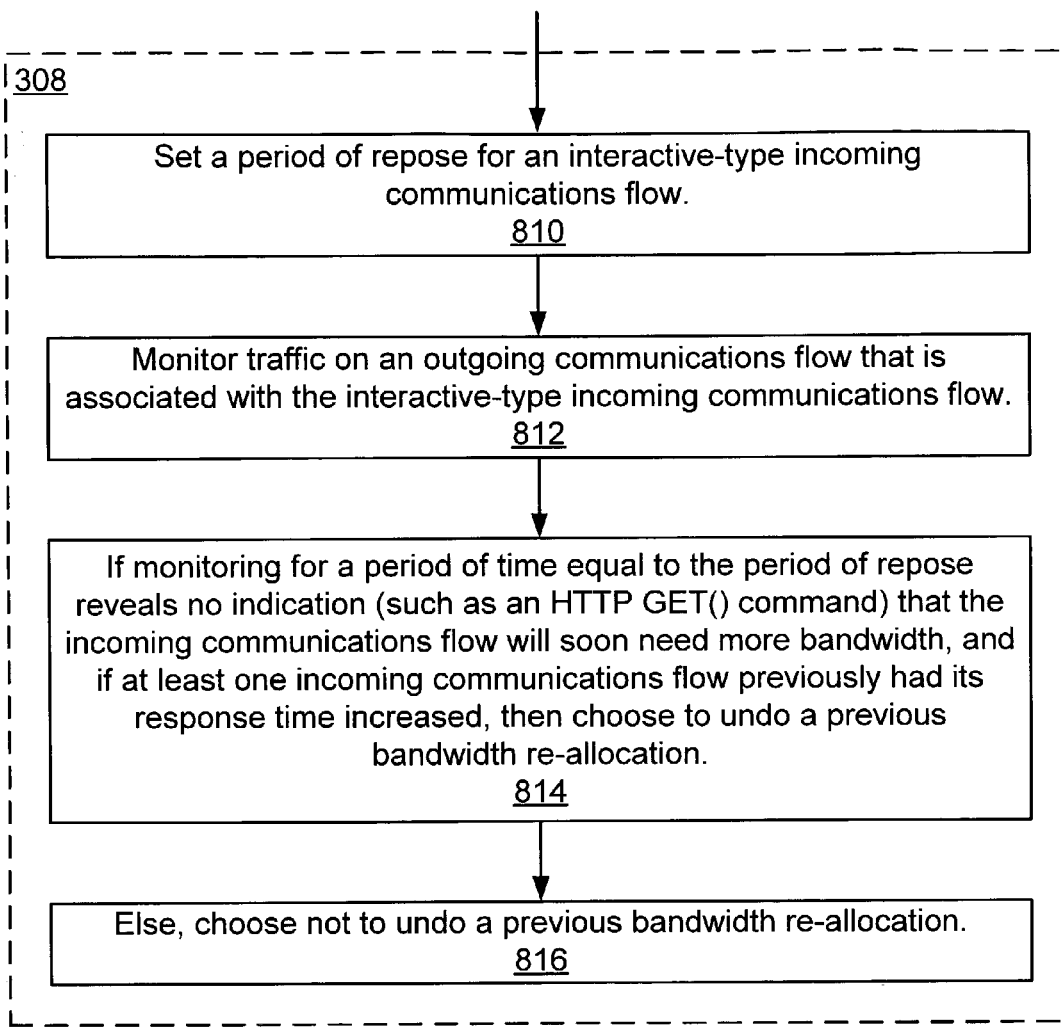

As discussed above in relation to steps 308 and 310 of FIG. 3, it may be a good idea to "undo" a previous bandwidth re-allocation. If the re-allocation was implemented by the LSP 706 inserting delays between an application program and the network protocol stack 708, for example, it may be undone by asking the LSP 706 to remove or reduce the delays. The methods of FIGS. 8a through 8c present examples of how to decide when to undo a previous re-allocation. As such, these methods are roughly parallel to the methods of FIGS. 5a through 5c.

In FIG. 8a, as in FIG. 5a, a threshold is set and the total amount of bandwidth of the common communications link 108 presently used by all incoming communications flows is monitored. If the total amount of bandwidth used is below the threshold, then the receiver 102 may decide to undo the effects of a previous re-allocation. A lag time may be introduced between re-allocating in FIG. 5a and undoing the re-allocation in FIG. 8a to prevent too-rapid changes back and forth.

FIG. 8b also relies on a lag time to prevent a rapid re-allocation/undo cycle. This methods parallels that of FIG. 5b which re-allocates bandwidth of an interactive incoming communications flow in anticipation of a large amount of incoming data in response to a user's request. Steps 810 and 812 monitor the outgoing flow associated with the incoming flow and if no indication of a request is seen for a while (called a "period of repose"), then the previous re-allocation is undone. Thus, no extra bandwidth is "reserved" for the interactive incoming flow unless there is a strong anticipation that the extra bandwidth will shortly be needed.

Finally, the method of FIG. 8c, like the method of FIG. 5c, monitors a characteristic of an incoming communications flow and compares the monitored characteristic against a set desired value range. If the monitored characteristic has been within the desired value range for a while (similar to the period of repose of FIG. 8b), then the incoming flow may not need any additional bandwidth and a previous re-allocation may be undone. The period of repose is especially important in this case because it might be the case that the previous re-allocation is the only thing keeping the characteristic within the desired value range. The receiver 102 probably does not know that, however, so it may choose to periodically test by undoing the previous re-allocation. If that causes the characteristic to depart from the desired value range, then another re-allocation may be necessary. The period of repose can also then be increased to prolong the period until the next testing.

In view of the many possible embodiments to which the principles of the present invention may be applied, it should be recognized that the embodiments described herein with respect to the drawing figures are meant to be illustrative only and should not be taken as limiting the scope of the invention. Those of skill in the art will recognize that some details, such as implementation of the LSP 706, are determined by the internal computing environment of the receiver 102. Although the invention is described in terms of software modules or components, some processes may be equivalently performed by hardware components. Therefore, the invention as described herein contemplates all such embodiments as may come within the scope of the following claims and equivalents thereof.

We claim:

1. In a communications environment with a receiver computing device receiving a plurality of incoming communications flows over a common communications link, a method for allocating incoming bandwidth of the common communications link among the plurality of incoming communications flows, the method comprising:
    assigning a priority to each incoming communications flow;
    deciding whether to re-allocate the incoming bandwidth of the common communications link among the incoming communications flows; and
    if a decision is made to re-allocate the incoming bandwidth, then:
    selecting an incoming communications flow with an assigned priority lower than the assigned priority of another incoming communications flow; and
    increasing an average response time for messages received over the selected incoming communications flow,
    wherein increasing an average response time for messages received over the selected incoming communications flow comprises utilizing a method selected from the group consisting of:
    delaying presentation of messages received over the selected incoming communications flow to an application associated with the selected incoming communications flow,
    delaying transmission of message acknowledgements over an outgoing communications flow associated with the selected incoming communications flow, and decreasing a size of a receiver buffer pool associated with the selected incoming communications flow.

2. The method of claim 1 wherein at least one incoming communications flow is associated with an application running on a computing device other than the receiver computing device.

3. The method of claim 1 wherein assigning a priority comprises choosing a priority selected from the group consisting of: high priority, medium priority, and low priority.

4. The method of claim 1 wherein assigning a priority comprises choosing a priority selected from the group consisting of: always real-time priority, real-time priority, always interactive priority, interactive priority, always back-off priority, and back-off priority.

5. The method of claim 1 wherein assigning a priority to an incoming communications flow comprises analyzing a name of an application associated with the incoming communications flow.

6. The method of claim 1 wherein assigning a priority to an incoming communications flow comprises analyzing dataflow patterns of the incoming communications flow.

7. The method of claim 6 wherein analyzing dataflow patterns reveals that the incoming communications flow is a real-time-type communications flow and wherein assigning a priority comprises choosing a priority selected from the group consisting of: high priority, always real-time priority, and real-time priority.

8. The method of claim 6 wherein analyzing dataflow patterns reveals that the incoming communications flow is a browser-type communications flow and wherein assigning a priority comprises choosing a priority selected from the group consisting of: medium priority, always interactive priority, and interactive priority.

9. The method of claim 6 wherein analyzing dataflow patterns reveals that the incoming communications flow is a file-transfer-type communications flow and wherein assigning a priority comprises choosing a priority selected from the group consisting of: low priority, always back-off priority, and back-off priority.

10. The method of claim 1 wherein assigning a priority to an incoming communications flow comprises:
    analyzing input from a user of the receiver associating a priority with an application associated with the incoming communications flow; and
    deriving a priority for the incoming communications flow from the priority associated with the application associated with the incoming communications flow.

11. The method of claim 10 wherein the incoming communications flow is associated with an application running on a computing device other than the receiver computing device.

12. The method of claim 10 wherein analyzing input from a user of the receiver comprises:
    for a plurality of incoming communications flows, associating an application with each incoming communications flow;
    for each of the associated applications, measuring an amount of incoming bandwidth of the common communications link used by the associated application;
    creating a list of the associated applications and the measured amounts of incoming bandwidth used by the associated applications;
    displaying the list to the user; and receiving from the user input associating a priority with an associated application on the list.

13. The method of claim 12 wherein analyzing input from a user further comprises:
    associating an application with a potential, but non-current, incoming communications flow; and
    adding to the created list the application associated with the potential incoming communications flow.

14. The method of claim 1 wherein assigning a priority to an incoming communications flow comprises analyzing information selected from the group consisting of: an amount of time that an application associated with the incoming communications flow has been active, an amount of bandwidth used by the incoming communications flow, and input from a user of the receiver associated a priority with a sender computing device associated with the incoming communications flow.

15. The method of claim 1 wherein deciding whether to re-allocate the incoming bandwidth of the common communications link comprises:

if a first incoming communications flow has an assigned priority higher than an assigned priority of a second incoming communications flow, then choosing to re-allocate.

16. The method of claim 1 wherein deciding whether to re-allocate the incoming bandwidth of the common communications link comprises:
setting a threshold value for an amount of the incoming bandwidth of the common communications link;
measuring an amount of the incoming bandwidth of the common communications link that is used;
comparing the measured amount with the threshold value; and if the measured amount exceeds the threshold value, and if a first incoming communications flow has an assigned priority higher than an assigned priority of a second incoming communications flow, then choosing to re-allocate.

17. The method of claim 1 wherein deciding whether to re-allocate the incoming bandwidth of the common communications link comprises:
monitoring an outgoing communications flow associated with a first incoming communications flow; and
if an indication is seen on the monitored outgoing communications flow that the first incoming communications flow will soon need more bandwidth, and if the first incoming communications flow has an assigned priority higher than an assigned priority of a second incoming communications flow, then choosing to re-allocate.

18. The method of claim 17 wherein monitoring an outgoing communications flow comprises watching for a Hyper Text Transfer Protocol GET( ) command.

19. The method of claim 1 wherein deciding whether to re-allocate the incoming bandwidth of the common communications link comprises:
setting a desired value range for a Quality of Service (QOS) parameter of a first incoming, communications flow;
measuring the QOS parameter of the first incoming communications flow;
comparing the measured QOS parameter with the QOS desired value range; and
if the measured QOS parameter does not lie within the QOS desired value range, and if the first incoming communications flow has an assigned priority higher than an assigned priority of a second incoming communications flow, then choosing to reallocate.

20. The method of claim 19 wherein measuring the QOS parameter comprises measuring a parameter selected from the group consisting of: latency and amount of incoming bandwidth of the common communications link that is used.

21. The method of claim 1 wherein increasing an average response time for messages received over the selected incoming communications flow comprises utilizing a method selected from the group consisting of: delaying presentation of messages received over the selected incoming communications flow to an application associated with the selected incoming communications flow, delaying transmission of message acknowledgements over an outgoing communications flow associated with the selected incoming communications flow, and decreasing a size of a receiver buffer pool associated with the selected incoming communications flow.

22. The method of claim 1 further comprising:
deciding whether to decrease an average response time for messages received over the selected incoming communications flow; and
if a decision is made to decrease the average response time, then decreasing the average response time for messages received over the selected incoming communications flow.

23. The method of claim 22 wherein deciding whether to decrease an average response time comprises:
setting a threshold value for an amount of the incoming bandwidth of the common communications link;
measuring an amount of the incoming bandwidth of the common communications link that is used;
comparing the measured amount with the threshold value; and
if the measured amount is below the threshold value, then choosing to decrease the average response time.

24. The method of claim 22 wherein deciding whether to decrease an average response time comprises:
setting a repose value;
monitoring an outgoing communications flow associated with a first incoming communications flow; and
if for a period of time equal to the repose value, no indication is seen on the monitored outgoing communications flow that the first incoming communications flow will soon need more bandwidth, then choosing to decrease the average response time.

25. The method of claim 24 wherein monitoring an outgoing communications flow comprises watching for a Hyper Text Transfer Protocol GET( ) command.

26. The method of claim 22 wherein deciding whether to decrease an average response time comprises:
setting a desired value range for a Quality of Service (QOS) parameter of a first incoming communications flow;
measuring the QOS parameter of the first incoming communications flow;
comparing the measured QOS parameter with the QOS desired value range; and
if the measured QOS parameter lies within the QOS desired value range, then choosing to decrease the average response time.

27. The method of claim 26 wherein measuring the QOS parameter comprises measuring a parameter selected from the group consisting of: latency and amount of incoming bandwidth of the common communications link that is used.

28. The method of claim 22 wherein decreasing an average response time comprises utilizing a method selected from the group consisting of: removing a delay in presentation of messages received over the selected incoming communications flow to an application associated with the selected incoming communications flow, removing a delay in transmission of message acknowledgements over an outgoing communications flow associated with the selected incoming communications flow, and increasing a size of a receiver buffer pool associated with the selected incoming communications flow.

29. In a communications environment with a receiver computing device receiving a plurality of incoming communications flows over a common communications link, a system for allocating incoming bandwidth of the common communications link among the plurality of incoming communications flows, the system comprising:
communications hardware supporting the common communications link;
a first protocol stack coordinating messaging of a first incoming communications flow over the common communications link;

a second protocol stack coordinating messaging of a second incoming communications flow over the common communications link;

a first application receiving messages from the first incoming communications flow;

a second application receiving messages from the second incoming communications flow;

a first layered service provider communicating with the first application and with the first incoming communications flow;

a second layered service provider communicating with the second application and with the second incoming communications flow; and a comparator for comparing a priority assigned to the first incoming communications flow with a priority assigned to the second incoming communications flow.

30. The system of claim 29 wherein the first protocol stack and the second protocol stack are the same.

31. The system of claim 29 wherein the first application is part of an operating system.

32. The system of claim 29 wherein the first layered server provider and the second layered service provider are the same.

33. The system of claim 29 wherein the first layered server provider increases an average response time for messages received over the first incoming communications flow by utilizing a method selected from the group consisting of: delaying presentation of messages received over the first incoming communications flow to the first application, delaying transmission of message acknowledgements over an outgoing communications flow associated with the first incoming communications flow, and decreasing a size of a receiver buffer pool associated with the first incoming communications flow.

34. In a communications environment with a receiver computing device receiving a plurality of incoming communications flows over a common communications link, a method for allocating incoming bandwidth of the common communications link among the plurality of incoming communications flows, the method comprising:

assigning a priority to each incoming communications flow;

deciding whether to re-allocate the incoming bandwidth of the common communications link among the incoming communications flows; and if a decision is made to re-allocate the incoming bandwidth, then:

selecting an incoming communications flow with an assigned priority lower than the assigned priority of another incoming communications flow; and increasing an average response time for messages received over the selected incoming communications flow, wherein analyzing input from a user of the receiver comprises:

for a plurality of incoming communications flows, associating an application with each incoming communications flow;

for each of the associated applications, measuring an amount of incoming bandwidth of the common communications link used by the associated application;

creating a list of the associated applications and the measured amounts of incoming bandwidth used by the associated applications;

displaying the list to the user; and receiving from the user input associating a priority with an associated application on the list.

35. The method of claim 34, wherein analyzing input from a user further comprises: associating an application with a potential, but non-current, incoming communications flow; and adding to the created list the application associated with the potential incoming communications flow.

36. In a communications environment with a receiver computing device receiving a plurality of incoming communications flows over a common communications link, a method for allocating incoming bandwidth of the common communications link among the plurality of incoming communications flows, the method comprising:

assigning a priority to each incoming communications flow;

deciding whether to re-allocate the incoming bandwidth of the common communications link among the incoming communications flows; and if a decision is made to re-allocate the incoming bandwidth, then:

selecting an incoming communications flow with an assigned priority lower than the assigned priority of another incoming communications flow; and increasing an average response time for messages received over the selected incoming communications flow, wherein deciding whether to re-allocate the incoming bandwidth of the common communications link comprises:

monitoring an outgoing communications flow associated with a first incoming communications flow; and if an indication is seen on the monitored outgoing communications flow that the first incoming communications flow will soon need more bandwidth, and if the first incoming communications flow has an assigned priority higher than an assigned priority of a second incoming communications flow, then choosing to re-allocate.

37. The method of claim 36 wherein monitoring an outgoing communications flow comprises watching for a Hyper Text Transfer Protocol GET() command.

38. In a communications environment with a receiver computing device receiving a plurality of incoming communications flows over a common communications link, a method for allocating incoming bandwidth of the common communications link among the plurality of incoming communications flows, the method comprising:

assigning a priority to each incoming communications flow; deciding whether to re-allocate the incoming bandwidth of the common communications link among the incoming communications flows; and if a decision is made to re-allocate the incoming bandwidth, then:

selecting an incoming communications flow with an assigned priority lower than the assigned priority of another incoming communications flow; and increasing an average response time for messages received over the selected incoming communications flow, wherein selecting an incoming communications flow comprises:

selecting a priority such that the selected priority is assigned to at least one incoming communications flow and such that the selected priority is at least as low as a priority assigned to any other incoming communications flow;

for each incoming communications flow with the selected priority, measuring an amount of incoming bandwidth of the common communications link used; and of the incoming communications flows with the selected priority, selecting an incoming communications flow such that the measured amount of incoming bandwidth used by the selected incoming communications flow is at least as high as the measured amount of incoming bandwidth used by any other incoming communications flow with the selected priority.

39. In a communications environment with a receiver computing device receiving a plurality of incoming communications flows over a common communications link, a method for allocating incoming bandwidth of the common communications link among the plurality of incoming communications flows, the method comprising:

assigning a priority to each incoming communications flow;

deciding whether to re-allocate the incoming bandwidth of the common communications link among the incoming communications flows;

if a decision is made to re-allocate the incoming bandwidth, then:

selecting an incoming communications flow with an assigned priority lower than the assigned priority of another incoming communications flow; and increasing an average response time for messages received over the selected incoming communications flow;

deciding whether to decrease an average response time for messages received over the selected incoming communications flow; and if a decision is made to decrease the average response time, then decreasing the average response time for messages received over the selected incoming communications flow, wherein deciding whether to decrease an average response time comprises:

setting a repose value; monitoring an outgoing communications flow associated with a first incoming communications flow; and if for a period of time equal to the repose value, no indication is seen on the monitored outgoing communications flow that the first incoming communications flow will soon need more bandwidth, then choosing to decrease the average response time.

40. The method of claim 39, wherein monitoring an outgoing communications flow comprises watching for a Hyper Text Transfer Protocol GET() command.

41. In a communications environment with a receiver computing device receiving a plurality of incoming communications flows over a common communications link, a method for allocating incoming bandwidth of the common communications link among the plurality of incoming communications flows, the method comprising:

assigning a priority to each incoming communications flow;

deciding whether to re-allocate the incoming bandwidth of the common communications link among the incoming communications flows;

if a decision is made to re-allocate the incoming bandwidth, then:

selecting an incoming communications flow with an assigned priority lower than the assigned priority of another incoming communications flow; and increasing an average response time for messages received over the selected incoming communications flow;

deciding whether to decrease an average response time for messages received over the selected incoming communications flow; and if a decision is made to decrease the average response time, then decreasing the average response time for messages received over the selected incoming communications flow, wherein decreasing an average response time comprises utilizing a method selected from the group consisting of: removing a delay in presentation of messages received over the selected incoming communications flow to an application associated with the selected incoming communications flow, removing a delay in transmission of message acknowledgements over an outgoing communications flow associated with the selected incoming communications flow, and increasing a size of a receiver buffer pool associated with the selected incoming communications flow.

* * * * *

UNITED STATES PATENT AND TRADEMARK OFFICE
CERTIFICATE OF CORRECTION

| | | |
|---|---|---|
| PATENT NO. | : 7,039,715 B2 | Page 1 of 1 |
| APPLICATION NO. | : 10/152112 | |
| DATED | : May 2, 2006 | |
| INVENTOR(S) | : Paul England et al. | |

It is certified that error appears in the above-identified patent and that said Letters Patent is hereby corrected as shown below:

In column 1, line 35, delete "modern" and insert -- modem --, therefor.

In column 1, line 36, delete "modern" and insert -- modem --, therefor.

In column 4, line 25, delete "reallocation" and insert -- re-allocation --, therefor.

In column 5, line 56, delete "modern" and insert -- modem --, therefor.

In column 5, line 57, delete "modern" and insert -- modem --, therefor.

In column 10, line 66, delete "reallocation" and insert -- re-allocation --, therefor.

Signed and Sealed this

Thirtieth Day of March, 2010

David J. Kappos
*Director of the United States Patent and Trademark Office*